US007093165B2

(12) United States Patent
Kageshima

(10) Patent No.: US 7,093,165 B2
(45) Date of Patent: Aug. 15, 2006

(54) DEBUGGING METHOD

(75) Inventor: Atsushi Kageshima, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 453 days.

(21) Appl. No.: 10/279,347

(22) Filed: Oct. 24, 2002

(65) Prior Publication Data

US 2003/0097613 A1 May 22, 2003

(30) Foreign Application Priority Data

Oct. 24, 2001 (JP) .......................... P2001-326792

(51) Int. Cl.
*G06F 11/00* (2006.01)

(52) U.S. Cl. ........................................ 714/34; 717/135

(58) Field of Classification Search .................. 714/26, 714/34, 35; 717/124, 134, 135; 713/501; 703/21
See application file for complete search history.

(56) References Cited

U.S. PATENT DOCUMENTS 5,530,804 A 6/1996 Edgington et al.
6,052,524 A * 4/2000 Pauna .......................... 703/22
6,230,114 B1 * 5/2001 Hellestrand et al. .......... 703/13
6,263,302 B1 * 7/2001 Hellestrand et al. .......... 703/17
6,591,378 B1 * 7/2003 Arends et al. ................ 714/38
6,625,572 B1 * 9/2003 Zemlyak et al. .............. 703/19
2002/0166112 A1 * 11/2002 Martin et al. ............... 717/124

OTHER PUBLICATIONS

Japanese Office Action mailed on Aug. 23, 2005.

* cited by examiner

*Primary Examiner*—Robert Beausoliel
*Assistant Examiner*—Philip Guyton
(74) *Attorney, Agent, or Firm*—Brenda O. Holmes; Kilpatrick Stockton LLP

(57) ABSTRACT

A software debugger adapted for connection to a hardware simulator simulating a hardware system includes a simulation information acquiring unit for acquiring cycle level execution information from the hardware simulator, and a debug processing unit for executing debugging by setting a processing width for time of one step execution instruction during debugging of a program executed on the hardware system based on the cycle level execution information.

2 Claims, 25 Drawing Sheets

FIG. 4

| C LEVEL (A1) | ASSEMBLY LEVEL (A2) |
|---|---|
| b=10 | ld r1, 0x0(r10) |
| c=5 | ld r2, 0x4(r10) |
| a=b + c | add r3, r2, r1 |
| | sd r3, 0x8(r10) |
| d=a*c | mult r4, r3, r1 |
| | sd r4, 0xc(r10) |

| ↓ | EXECUTION COMMAND | |
|---|---|---|
| | EXECUTION COMMAND | STEP WIDTH |
| (1) | b=10 | ———— |
| (2) | c=5 | ———— |
| (3) | a=b+c | ———— |
| (4) | | |
| (5) | d=a*c | ———— |
| (6) | | |

FIG. 14

| ASSEMBLY LEVEL |
| --- |
| div r3, r2, r1 |
| add r6, r5, r4 |
| add r7, r5, r8 |
| mult r9, r5, r4 |
| mult r10, r2, r1 |

FIG. 18

| ASSEMBLY LEVEL |
|---|
| ld1 r1, 0x0(r10) |
| ld1 r2, 0x4(r10) |
| add r3, r2, r1 |
| sd r3, 0x8(r10) |
| mult1 r4, r3, r1 |
| sd1 r4, 0xc(r10) |

DEBUGGING METHOD

CROSS REFERENCE TO RELATED APPLICATIONS

This application is based upon and claims the benefit of priority from the prior Japanese Patent Application P2001-326792 filed on Oct. 24, 2001; the entire contents of which are incorporated herein by reference.

BACKGROUND OF THE INVENTION

1. Field of the Invention

The present invention relates to a debugger used in software development and, more particularly, to a software debugger considering pipeline processing used in a hardware/software cooperation simulation environment, a system-level debugger, a debugging method, and a debugging program.

2. Description of the Related Art

A software debugger is known as a tool used for discovering behaviors or problems during software execution, and debugging in verification of functions including those of a hardware system and software operated on the hardware system at a system designing stage before hardware manufacturing. The software debugger debugs by using a source code before a program written in a high-level language such as a C language or Pascal is compiled. Using the software debugger, it is possible to operate including the setting of a stopping position (break point) on a line designated on the source code, checking of the content of register values or various variables used on the source code, and the like. Conventionally, the software debugger has had debugging only at a command level, which is designed for execution of a program of a high-level language by single software. This is because investigation of functional programs or behaviors of a program during execution has required only information obtained by a command unit of a high-level language. Accordingly, various settings on the debugger were all done by command units of high-level languages, and the debugger itself was not allowed to execute settings using units other than command units of high-level languages. For example, information displayed during the debugging was by a command unit of a high-level language, and a program counter, a step width and the like displayed during the execution of the command were all by command units of the high-level language. Also, for a break point to be given, a method of setting it during the command execution of a high-level language has been employed.

However, for the execution of debugging in a system level environment combining hardware and software, the conventional command unit of the high-level language is not sufficient. For example, when software debugging is carried out in the case of considering interruptions from outside a CPU, accurate debugging is impossible unless an execution command is at an assembly level. To improve performance by shortening software execution time, debugging including even cycle units must be carried out. It has become apparent that debugging using a command unit at assembly level or a cycle unit is now required. In other words, it is necessary to conduct debugging considering not only an operation in the CPU but also the effects of an external hardware system, which has a concept of time. A command level displayed by the debugger must also be displayed at the assembly level closer to the hardware. However, in the displaying method at the program counter, the setting method of a step width or a break point, or the like, of the conventional debugger, a problem of the impossibility of conducting sufficient debugging has been inherent for lack of time concept.

SUMMARY OF THE INVENTION

In accordance with an aspect of the present invention, a software debugger adapted for connection to a hardware simulator simulating a hardware system is provided. The software debugger encompasses: a) a simulation information acquiring unit configured to acquire cycle level execution information from the hardware simulator; and b) a debug processing unit configured to execute debugging by setting a processing width for time of one step execution instruction during the debugging of a program executed on the hardware system based on cycle level execution information.

In accordance with another aspect of the present invention, a system-level debugger adapted for connection to a hardware system is provided. The system-level debugger encompasses: a) a hardware simulator configured to execute simulation of the hardware system; and b) a software debugger provided with a simulation information acquiring unit configured to acquire cycle level execution information from the hardware simulator, and a debug processing unit configured to execute debugging by setting a processing width for time of one step execution instruction during the debugging of a program executed on the hardware system based on cycle level execution information.

In accordance with yet another aspect of the present invention, a debugging method is provided, which embraces the steps of: a) acquiring cycle level execution information from a hardware simulator simulating a hardware system to be debugged; and b) executing debugging by setting a processing width for time of one step execution instruction during the debugging of a program executed on the hardware system based on cycle level execution information.

In accordance with yet another aspect of the present invention, a computer program product to be executed by a computer for controlling a software debugger used with a hardware simulator simulating a hardware system is provided. The program product embraces: a) instructions configured to cause a simulation information acquiring unit to acquire cycle level execution information from the hardware simulator; and b) instructions configured to cause a debug processing unit to set a processing width for time of one step execution instruction during the debugging of a program executed on the hardware system based on cycle level execution information.

BRIEF DESCRIPTION OF THE DRAWINGS

FIG. 4 is a view showing programs used by software debuggers of the first and fourth embodiments of the present invention.

FIG. 14 is a view showing a program used by a software debugger of a second embodiment of the present invention.

FIG. 18 is a view showing a program used by a software debugger of the third embodiment of the present invention.

DETAILED DESCRIPTION OF THE INVENTION

Figure 1:
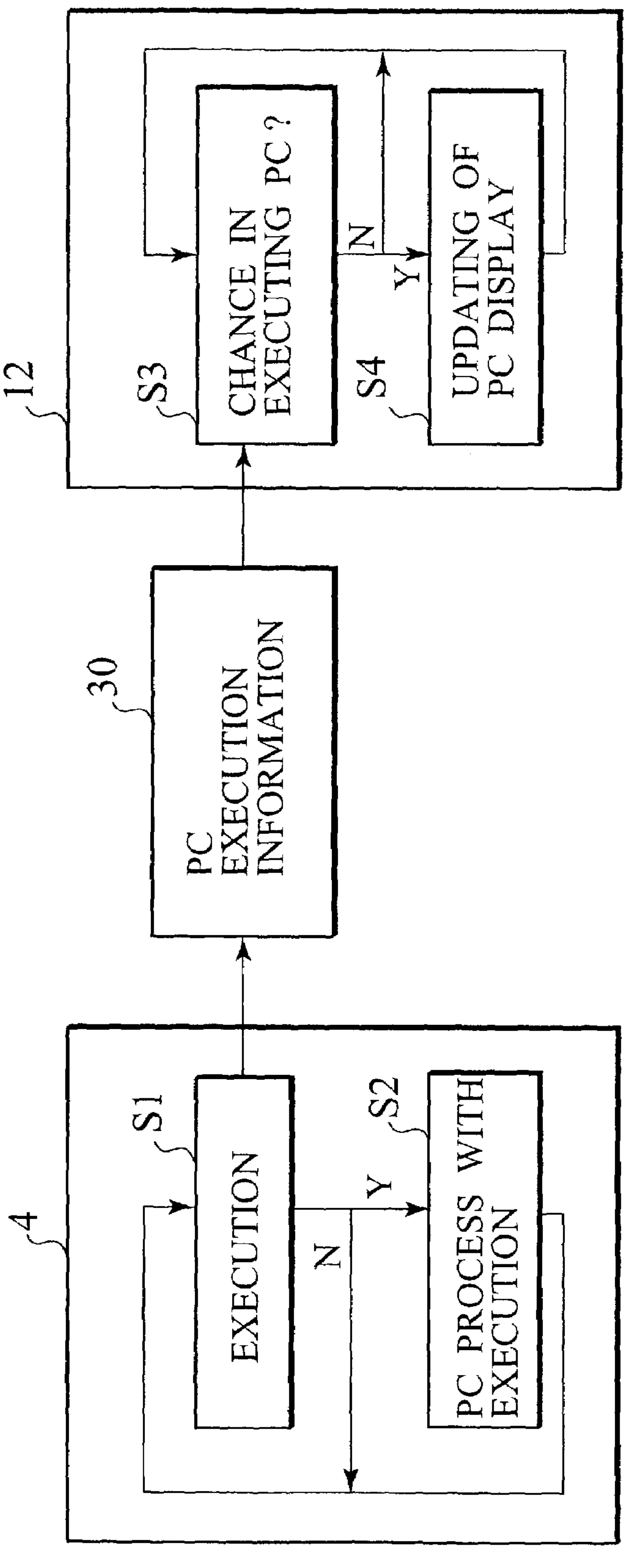
FIG. 1 is a view showing an example of an algorithm of a software debugger.

Next, description will be made of the preferred embodiments of the present invention with reference to the accompanying drawings. In the drawings, identical or similar portions are denoted by similar reference numerals. However, it should be kept in mind that the drawings are schematic, and the scale of measurement is different from reality. Accordingly, specific dimensions or the like must be determined by taking the following explanation into consideration. Needless to say, portions of different dimensional relations or scales between the drawings are included.

FIRST EMBODIMENT

Figure 2:
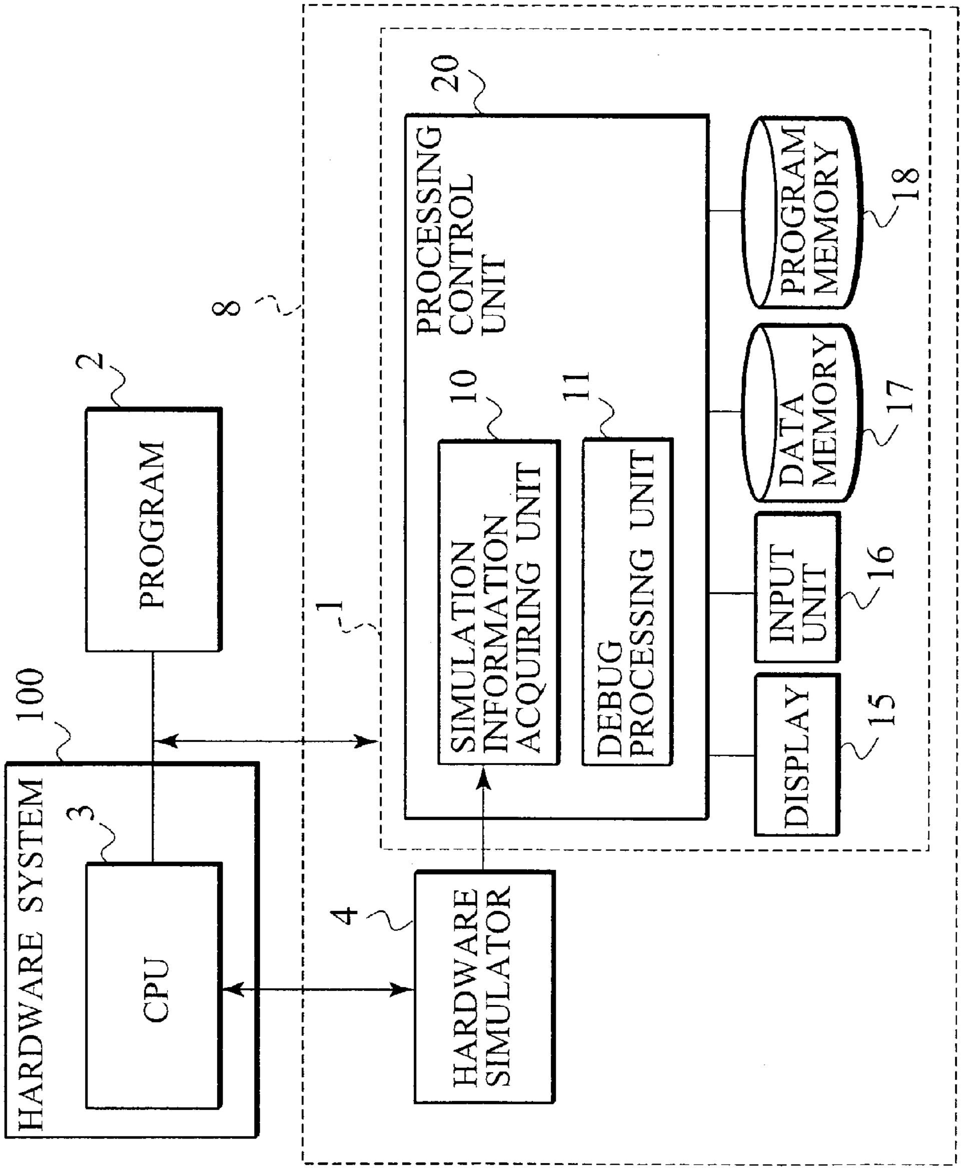
FIG. 2 is a view showing an execution environment of a software debugger according to a first embodiment of the present invention.

FIG. 2 is a view showing an execution environment of a software debugger according to a first embodiment of the present invention. As shown in FIG. 2, a system-level debugger 8 of the first embodiment includes a software debugger 1, and a hardware simulator 4 connected to a hardware system 100. A program 2 to be debugged is executed by a central processing unit (CPU) 3 of the hardware system 100. An operation of the entire system (target system) 100 including the CPU 3 is simulated by the hardware simulator 4. The software debugger 1 is connected to the hardware simulator 4 to debug the program 2 executed on the CPU 3. The program 2 is software such as an application, an OS or a device driver. The software debugger 1 includes a processing control unit 20, a display 15 connected to the processing control unit 20, an input unit 16, a data memory 17, and a program memory 18. The processing control unit 20 is provided with a simulation information acquiring unit 10 and a debug processing unit 11. The display 15 is a screen of a monitor or the like, and a liquid crystal display (LCD), a light emitting device (LED) panel, an electroluminescence (EL) panel or the like can be used. The input unit 16 is an equipment such as a keyboard or a mouse. When an input operation is carried out from the input unit 16, corresponding key information is transmitted to the processing control unit 20. The data memory 17 temporarily stores data being calculated or analyzed in processing at the processing control unit 20. The program memory 18 stores a program for causing the processing control unit 20 to execute the acquisition of pipeline information, displaying of the acquired information and the like. The simulation information acquiring unit 10 incorporated in the processing control unit 20 of the software debugger 1 of the first embodiment acquires hardware simulation information, such as address information (program counter) of a program (source code) being executed, an instruction code, a pipeline stage or a register value, from the hardware simulator 4. Based on the hardware simulation information acquired by the simulation information acquiring unit 10, the debug processing unit 11 incorporated in the processing control unit 20 optionally sets a step width of the program counter during debugging of the program executed on the hardware system 100, and debugs the program.

Figure 3:
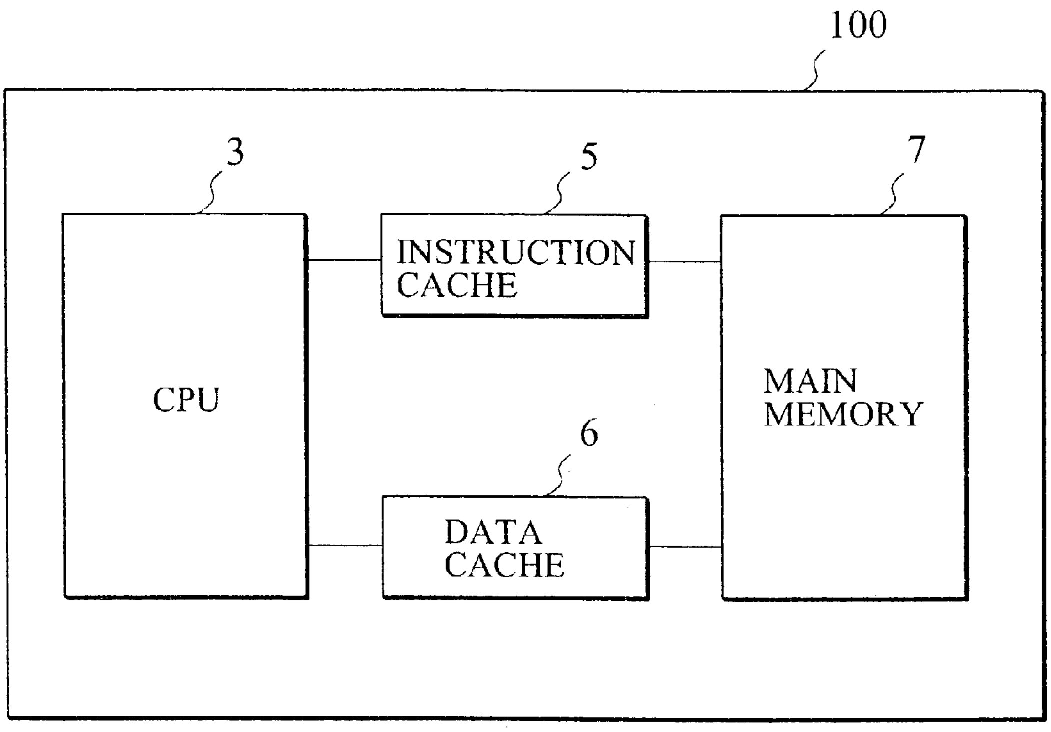
FIG. 3 is a configuration view of a target system to be debugged according to the first embodiment of the present invention.

FIG. 3 shows a configuration of the target system (hardware system) 100 to be debugged according to the first embodiment of the present invention. As shown in FIG. 3, the target system 100 of the first embodiment includes the CPU 3 executing a program to be debugged, an instruction cache 5 capable of loading(load)/storing(store) within one cycle, a data cache 6, and a main memory 7 requiring five cycles for loading/storing. In the target system 100, when the CPU 3 accesses the main memory 7, four commands and data are read in the instruction cache 5 and the data cache 6 all at once. Accordingly, memory accessing occurs for every four commands when a cache mistake is made, and reading is carried out from the cache when there are no cache mistakes. Before program execution, execution commands are all placed in the main memory 7, and data is placed in the data cache 6. The CPU 3 is a reduced instruction set computer (RISC) provided with five pipeline stages of fetching (Fetch), decoding (Decode), executing (Execute), memory accessing (Memory) and register writing (Write). The CPU 3 used in the target system 100 is the RISC. However, it may be a complex instruction set computer (CISC). Execution commands executed on the CPU 3 are loading (ld), storing (sd), adding (add) and multiplying (mult). At the respective pipeline stages, the following operations are carried out:

(1) Fetch stage: reading of execution command into CPU;
(2) Decode stage: decoding of execution command;
(3) Execute stage: calculating;
(4) Memory stage: data cache accessing at time of execution of loading/storing command; and
(5) Write stage: writing in register (data loaded by execution command "id" is also written in the register by this timing).

FIG. 4 shows an example of a program to be executed on the software debugger 1 of the first embodiment of the present invention. As shown in FIG. 4, the program is composed of an algorithm, which includes a series of operations of assigning values to two variables b and c, assigning a value (b+c) obtained by adding the variables b and c to a variable a, and assigning a value (a*c) obtained by multiplying the variables a and c to a variable d. Column "A1" of FIG. 4 represents a descriptive example where the program is described in a high-level language (C language level), while column "A2" of FIG. 4 represents a descriptive example where the program is described in a machine language (assembly level). Reference numerals "r1", "r2", "r4" and "r10" in the column "A1" of FIG. 4 denote register addresses.

When the program shown in FIG. 4 is executed on the CPU 3 of the target system 100, the debugger of the first embodiment of the present invention acquires information on pipeline stage operations of the CPU 3 for each cycle from the hardware simulator 4, thereby clarifying a relationship between the pipeline stage operations, with consideration being given to time of the executed program.

Figure 5:
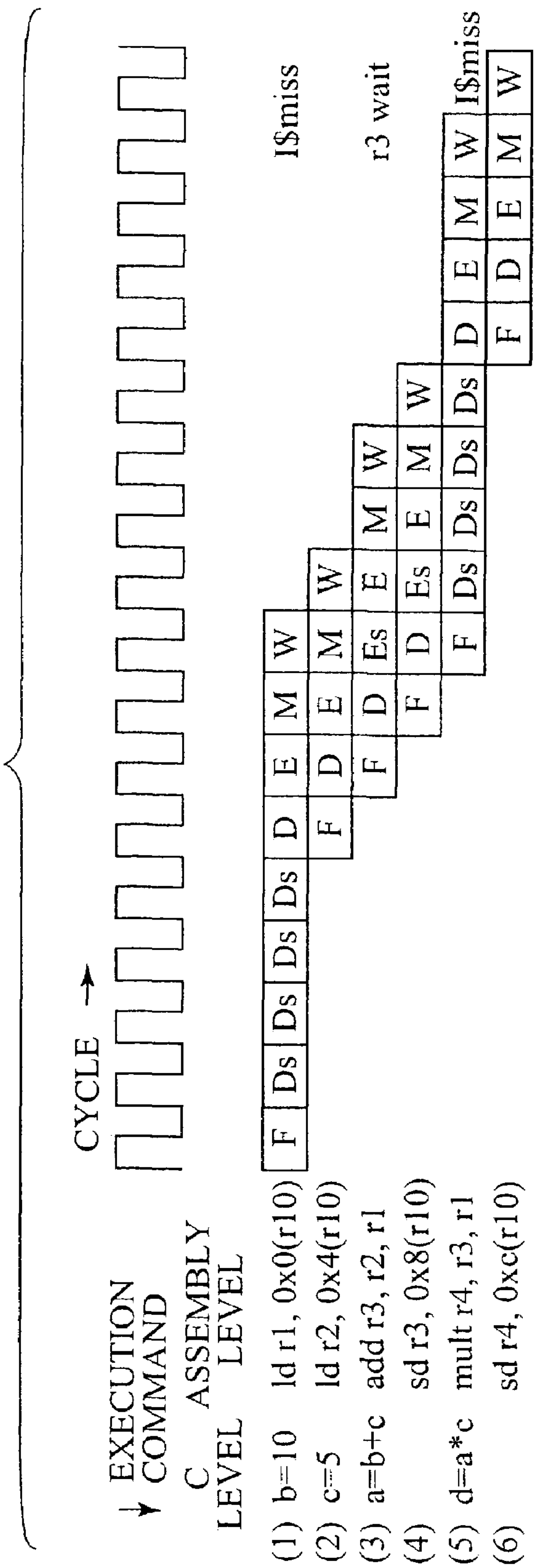
FIG. 5 is a view showing a result of a pipeline stage in a CPU at the time of execution of the program used by the software debugger of the first embodiment of the present invention.

FIG. 5 shows an operation and the time (cycle) of the executed program when the calculation shown in FIG. 4 is executed at the pipeline stage. In FIG. 5, codes "F", "D", "E", "M" and "W" respectively denote "Fetch", "Decode", "Execute", "Memory" and "Write". A subscript "s" denotes the occurrence of stalling. From FIG. 5 it can be understood that an instruction cache mistake at the Decode stage with a first execution command b=10 causes stalling for four cycles of the execution of memory accessing, and an instruction cache mistake at the Decode stage with a fifth execution command d=a*c causes stalling for four cycles of the execution of memory accessing. It can also be understood that at the Execute stage with a third execution command a=b+c, the memory stage execution of the previous command causes stalling for one cycle until a value of c=5 is set in the register r2. As shown in FIG. 5, by considering the time of the executed program, a stalling state in pipeline processing is clarified.

FIG. 1 shows an algorithm of a software debugger 12 connected to the hardware simulator 4. The algorithm of the software debugger 12 will now be described by referring to FIG. 1.

(a) First, in step S1, the hardware simulator 4 executes a command in a high-level language (C language level) for a target system. Here, if a current program counter is incremented, the process proceeds to step S2, where a command indicated by a next program counter is executed. On the other hand, if the current program counter is not incremented, the hardware simulator 4 outputs execution information 30 of the program counter (PC) being executed at present to the software debugger 12.

(b) Then, in step S3, the software debugger 12 acquires the execution information 30 of the PC being executed at present. Then, based on the PC execution information 30, the software debugger 12 debugs for each program counter.

(c) In step S4, if any changes occur at the program counter in step S3, the software debugger 12 updates the program counter to be displayed.

Figure 6:
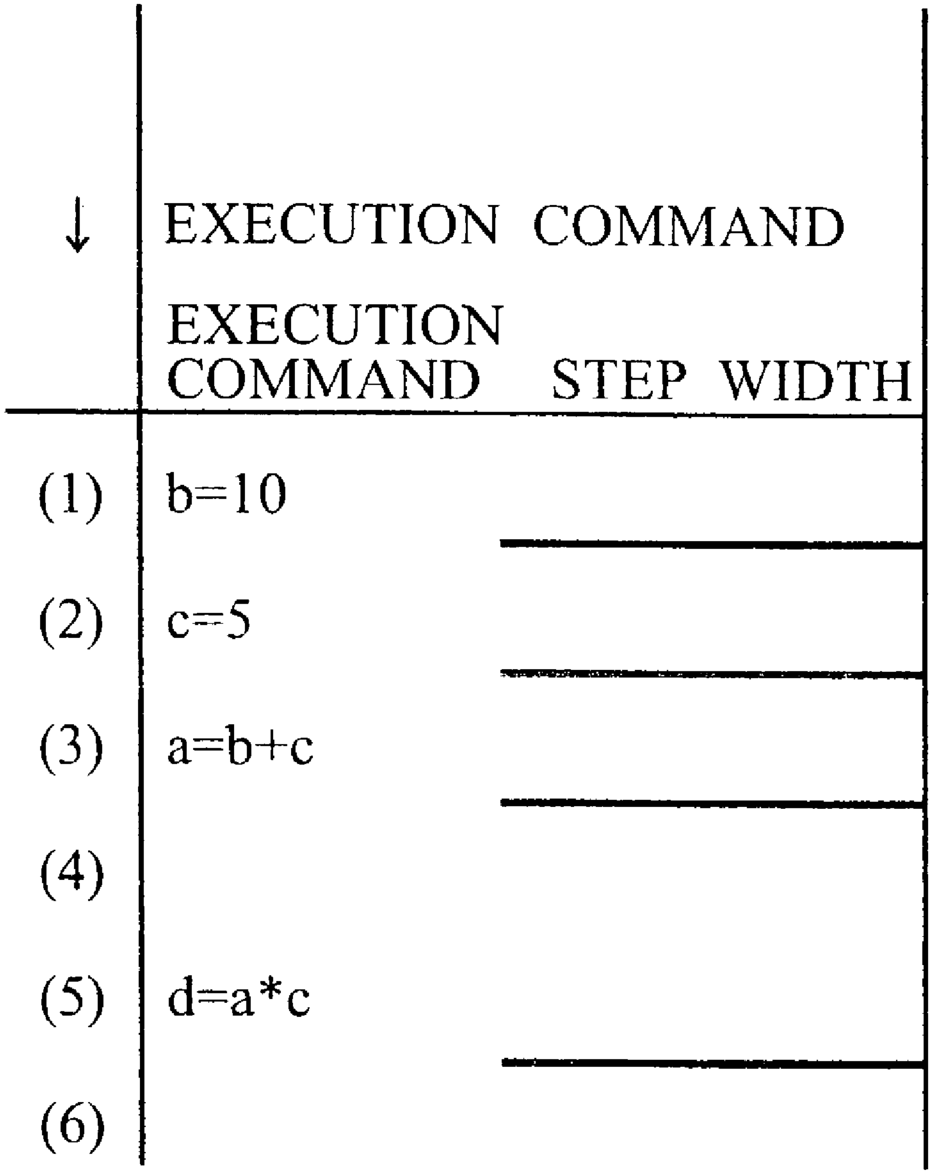
FIG. 6 is a view showing a step width of the software debugger used in the first embodiment of the present invention.

FIG. 6 shows changes in step time when debugging is carried out by the software debugger 12 in execution of the program of FIG. 4 on the CPU 3 of the target system 100. As shown in FIG. 6, in the software debugger 12, a step width is set for each execution of an execution command by a command unit of the high-level language (C language level). Thus, it can be understood that the step width is set for each execution of an execution stage. Here, a "step width" means a processing width at execution time of one step (execution instruction time).

Figure 7:
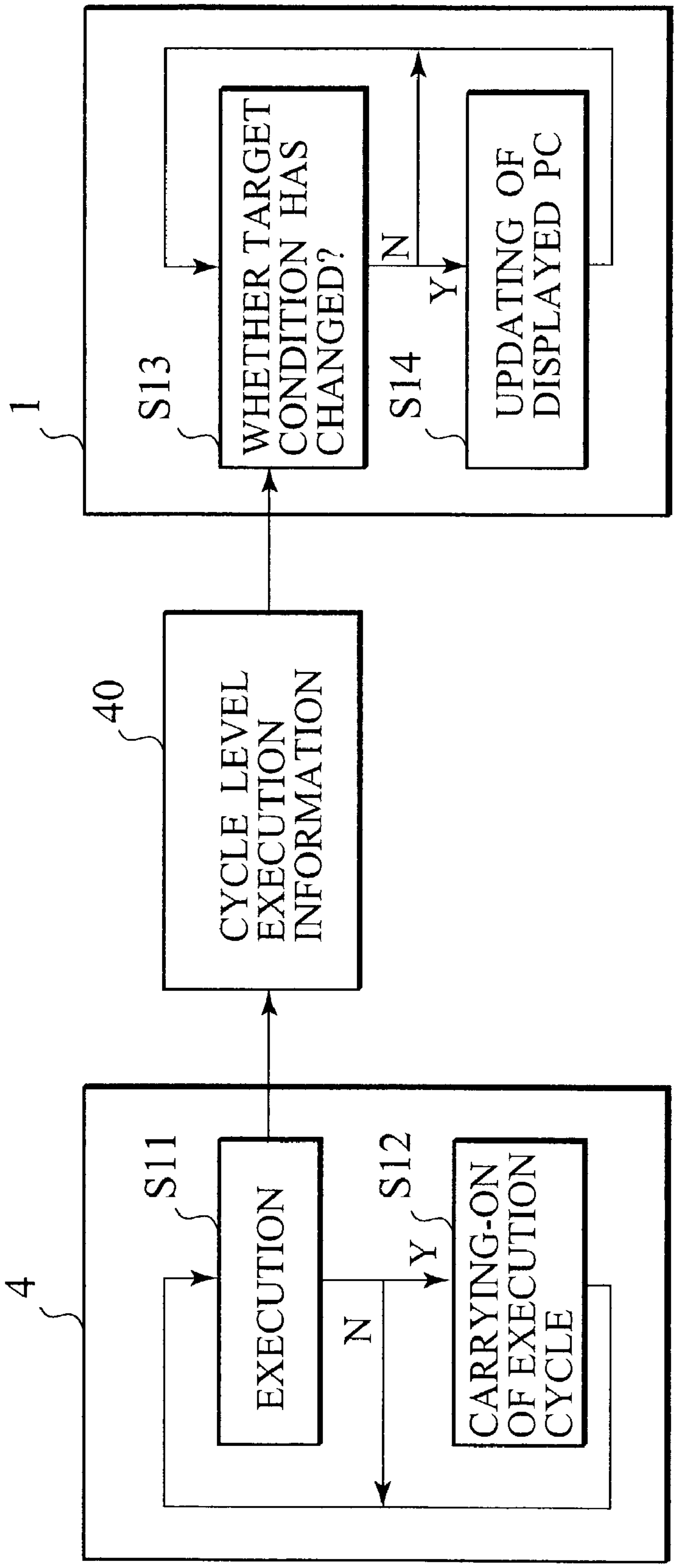
FIG. 7 is a view showing an example of an algorithm of the software debugger of the first embodiment of the present invention.

Next, description will be made of a software debugging method of the first embodiment of the present invention with reference to FIG. 7.

(a) First, in step S11, the hardware simulator 4 executes a command for the target system 100 of FIG. 2 at cycle level. Here, if a current cycle is executed, the process proceeds to step S12, where a command of a next cycle is executed. On the other hand, if the current cycle is not executed, the hardware simulator 4 outputs hardware simulation information on a pipeline stage, a register value or the like of the current cycle with consideration given to time of an executed program as cycle level execution information 40 to the hardware debugger 1.

(b) Then, in step S13, the simulation information acquiring unit 10 of the software debugger 1 of FIG. 2 acquires the cycle level execution information 40 on a pipeline stage, a register value or the like of the current cycle from the hardware simulator 4. Then, the debug processing unit 11 of the software debugger 1 of FIG. 2 executes debugging for each cycle (time of executed program) based on the cycle level execution information 40. A debugging method for each cycle in step S13 will be described in detail later.

(c) In step S14, if changes occur in conditions for debugging, the debug processing unit 11 of the software debugger 1 updates the program counter to be displayed. For the program counter to be displayed, a program counter at an optional pipeline stage designated by a user of the CPU 3 of FIG. 2, targeted for debugging, can be displayed.

Hereinafter, description will be made of specific examples of software debugging methods according to the first embodiment of the present invention. In the description of the specific examples, a program counter to be executed at the Execute stage is displayed for easier explanation.

METHOD EXAMPLE 1-1

The software debugging method of the first embodiment of the present invention enables all the cycles to be checked by setting a step width of debugging in the debug processing unit 11 of FIG. 2 to one cycle.

As shown in FIG. 6, program counters cannot be traced at all the cycles with the step width in the high-level language by the software debugger 12. Thus, in the debugging method of the first embodiment, all the cycles are checked by setting the step width to one cycle.

Figure 8:
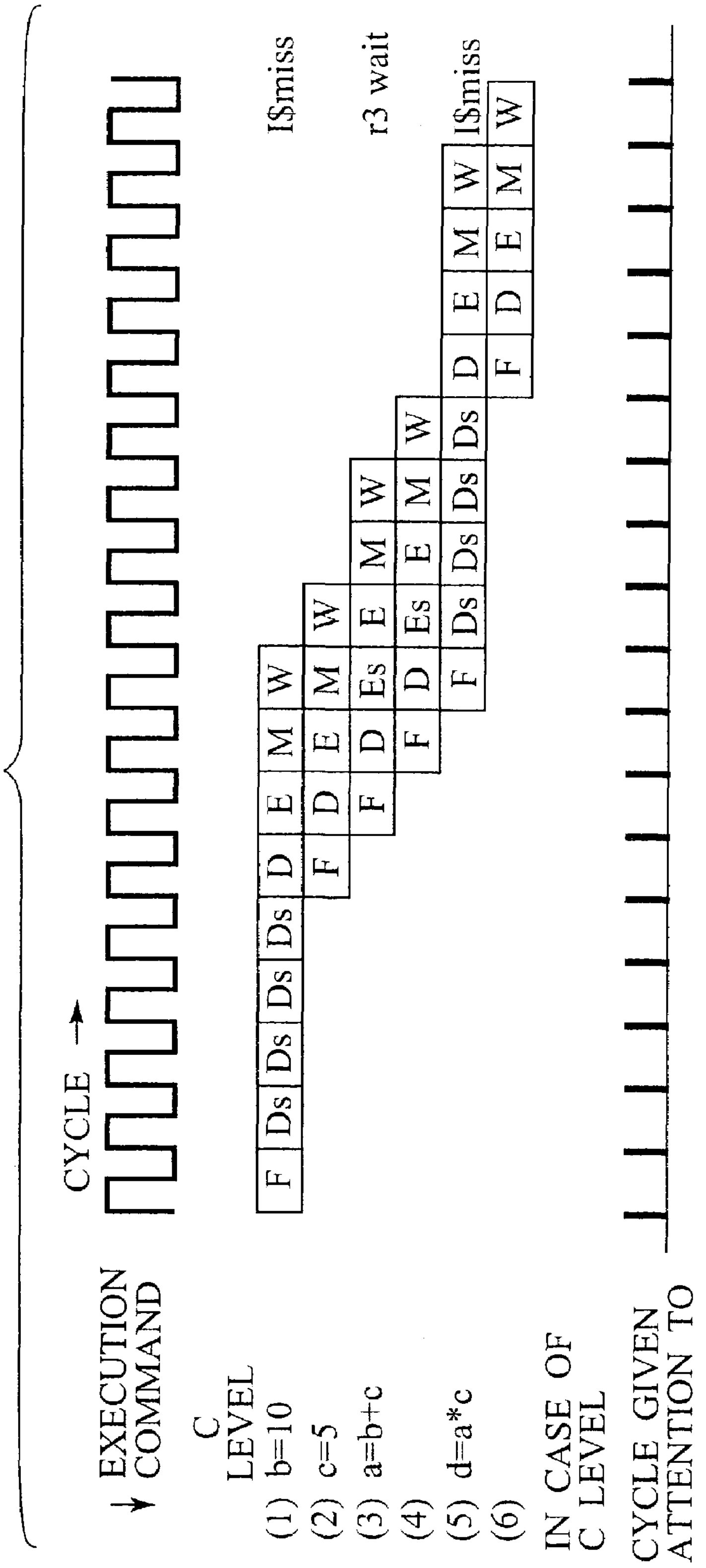
FIG. 8 is a view showing a step width when a debugging method of the first embodiment of the present invention is applied.

FIG. 8 is a view showing a step width at a cycle level when debugging is carried out by the debugging method of the first embodiment in execution of the program of FIG. 4 on the CPU 3 of the target system 100 of FIG. 3. It can be understood that stalling for four cycles occurs with a first execution command b=10, stalling for one cycle occurs with a third execution command a=b+c, stalling for one cycle occurs with a fourth execution command a=b+c, and stalling for four cycles occurs with a fifth execution command d=a*c, but these are not bugs. As shown in FIG. 8, the software debugging method of the first embodiment enables a state of the cycle level to be understood.

According to the debugging method of the first specific example, it is possible to debug with consideration given to effects of the external hardware system 100 of FIG. 2 changed by cycle units.

METHOD EXAMPLE 1-2

In a second specific example of a debugging method related to the first specific example of the first embodiment, the debug processing unit 11 of FIG. 2 pays attention to pipeline stage information of the CPU 3 contained in information acquired from the hardware simulator 4, and sets a step width for each change in the execution command executed at each pipeline stage.

Figure 22:
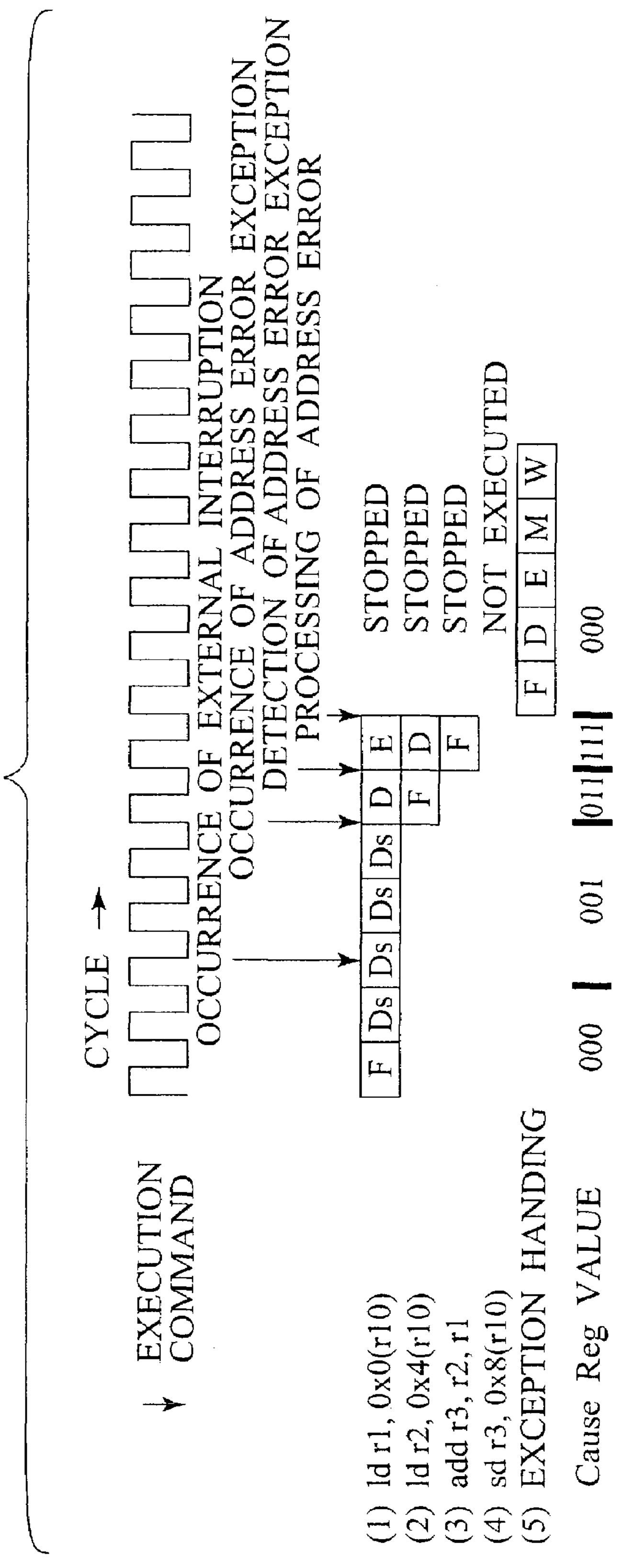
FIG. 22 is a view showing results of a pipeline stage and a register in a CPU at the time of occurrence of an exceptional case, used in the fourth embodiment of the present invention.

A sequence of execution commands executed on the CPU 3 is normally similar at any of the pipeline stages under observation to unless a factor that disrupts the execution sequence is present. However, a timing (cycle) for execution varies from pipeline stage to pipeline stage. Also, a change made in the execution sequence of the commands by a jumping command, a branching command or an exception causes a problem in that the sequence of execution commands to be executed is different depending on the pipeline stage under consideration. For example, as shown in FIG. 22, if the occurrence of an exception in the middle of the process changes the execution sequence, a change in a program counter with attention given to the Fetch stage is (1)→(2)→(3)→(5), while the change is completely different, e.g., (1)→(5), if attention is given to the Execute stage. Accordingly, in the case of debugging being carried out by considering a causal relation between a program executed on the CPU 3 and the hardware of the entire system including the CPU 3, the pipeline stage under consideration must be changed depending on the operation or content to be checked. Thus, the debugging method of the second specific example of the first embodiment is designed to enable a step width to be set for each change in the execution command executed at each pipeline stage by considering the pipeline stage information of the CPU 3 contained in the information acquired from the hardware simulator 4.

Figure 9:
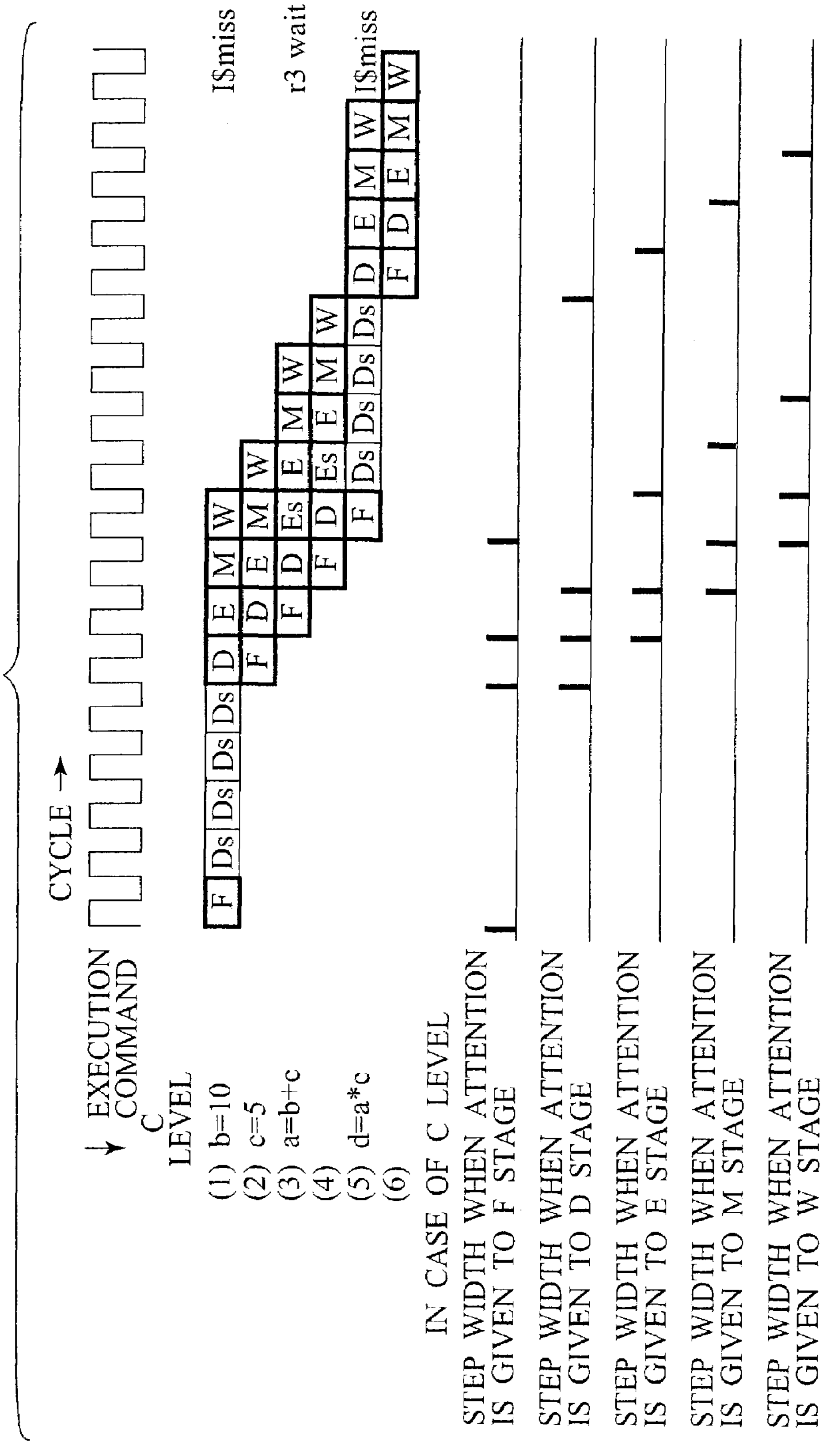
FIG. 9 is another view showing the step width when the debugging method of the first embodiment of the present invention is applied.

FIG. 9 shows step widths with attention given to five pipeline stages, i.e., "F", "D", "E", "M", and "W" stages, when debugging is carried out by the debugging method of the second specific example of the first embodiment in execution of the program of FIG. 4 on the CPU 3 of the target system (hardware system) 100. From FIG. 9, it can be understood that when attention is given to the "F" stage, step widths are set for each changes in execution command in a high-level language (C language), i.e., a first execution command b=10, a second execution command c=5, a third execution command a=b+c, and a fifth execution command d=a*c. It can also be understood that when attention is given to the "D", "E", "M" and "W" stages, similarly, step widths are set for each changes in execution command in the high-level language, i.e., a first execution command b=10, a second execution command c=5, a third execution command a=b+c, and a fifth execution command d=a*c.

According to the debugging method of the second specific example of the first embodiment, it is possible to easily debug the program executed on the hardware system 100 of FIG. 2 to determine whether the program is being executed at an intended pipeline stage by an intended timing or not.

METHOD EXAMPLE 1-3

In a third specific example of a software debugging method of the first embodiment, the debug processing unit 11 of FIG. 2 sets a step width for each change in a combination of program counters executed at the pipeline stages by observing all the pipeline stages of the CPU 3 of FIG. 3.

For execution commands executed on the CPU 3, if there is no pipeline stalling, different program counters are executed at all the pipeline stages at all cycles. Accordingly, the state of the pipeline stages in each cycle is different. However, for example, if a factor such as extra time causes pipeline stalling when a self-command is fetched from the main memory 7 of FIG. 3, a combination (state) of the program counters executed at all the pipeline stages can not change even if cycles progress. In this case, the target system 100 including the CPU 3 of FIG. 3 is not in operation. Transfer to a next cycle having a change made in the state by skipping the cycle of such a state is required from the standpoint of increasing debugging efficiency. Thus, the debugging method of the third specific example of the first embodiment is designed to enable stepping to be made for each change in the combination of the program counters executed at the pipeline stages.

Figure 10:
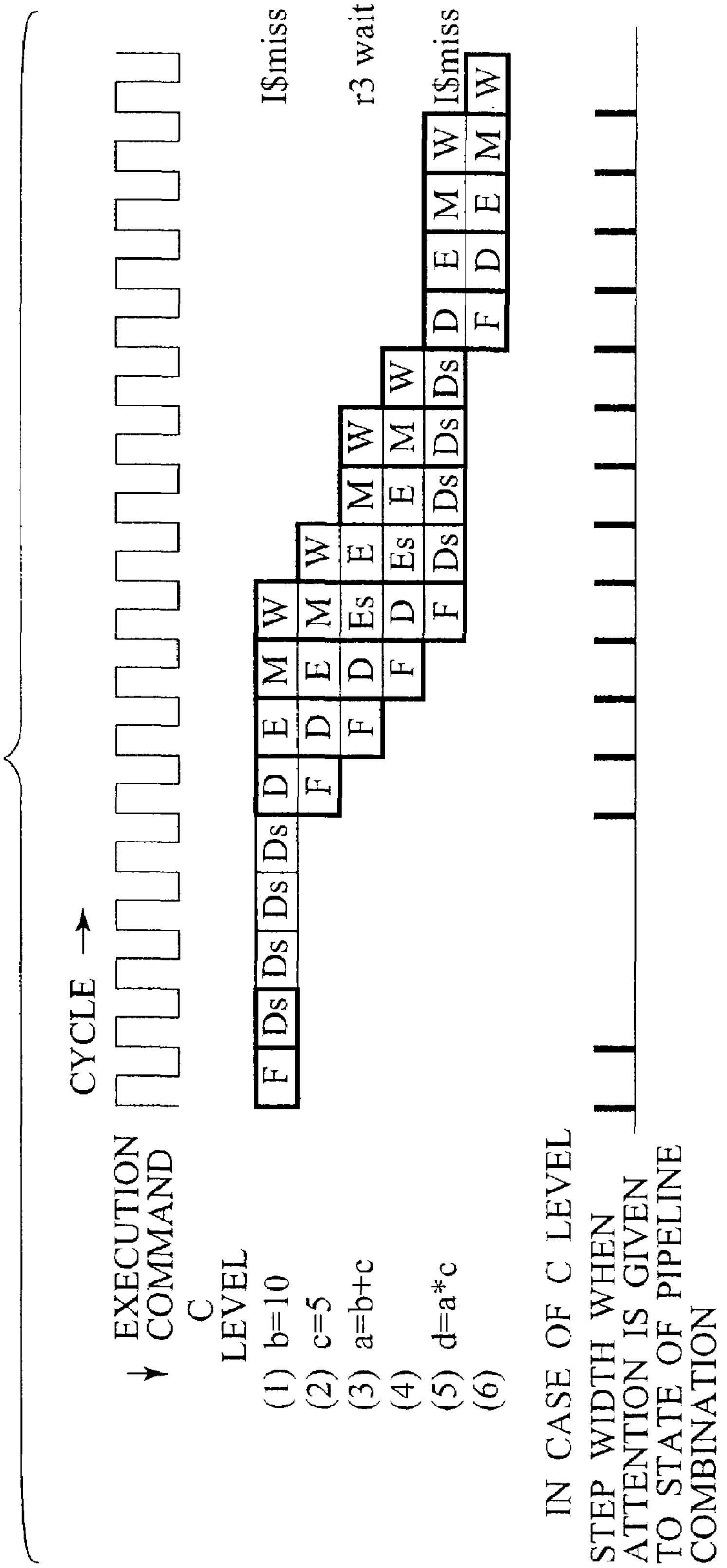
FIG. 10 is another view showing the step width when the debugging method of the first embodiment of the present invention is applied.

FIG. 10 shows step widths set when stepping is made for each change in the combination of the program counters executed at the pipeline stages in debugging carried out by the debugging method of the first embodiment in execution of the program of FIG. 4 on the CPU 3 of the target system 100 of FIG. 3.

According to the debugging method of the third specific example of the first embodiment, it is possible to debug by ignoring unnecessary cycles.

METHOD EXAMPLE 1-4

In a fourth specific example of a software debugging method of the first embodiment, the debug processing unit 11 of FIG. 2 sets a step width by matching a target execution command with a command change at assembly level.

In the case of the software debugger 12 of FIG. 1 designed to debug a signal program, the acquisition of debugging being information in the high-level language was enough. However, in the case of debugging carried out on the system combined with hardware, it is natural to execute debugging at the assembly level closer to the hardware. For example, one execution command of the C language level shown in "A1" of FIG. 4 is in reality realized by being executed in a combination of a plurality of assembly levels shown in "A2". Accordingly, the debugging method of the fourth specific example of the first embodiment is designed to set a step width by matching a target execution command with a command change at assembly level.

Figure 11:
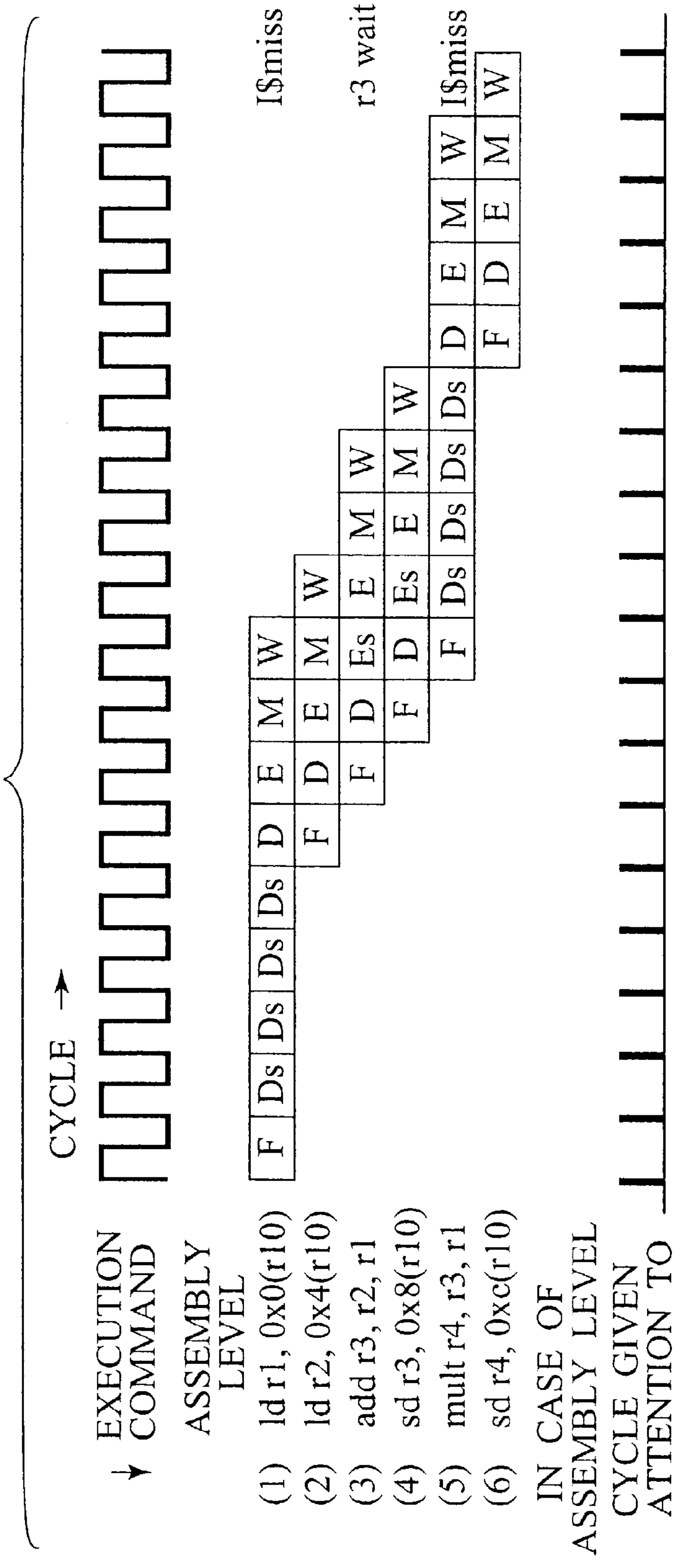
FIG. 11 is a view showing a step width when the display of FIG. 8 is applied at assembly level in the debugging method of the first embodiment of the present invention.
Figure 12:
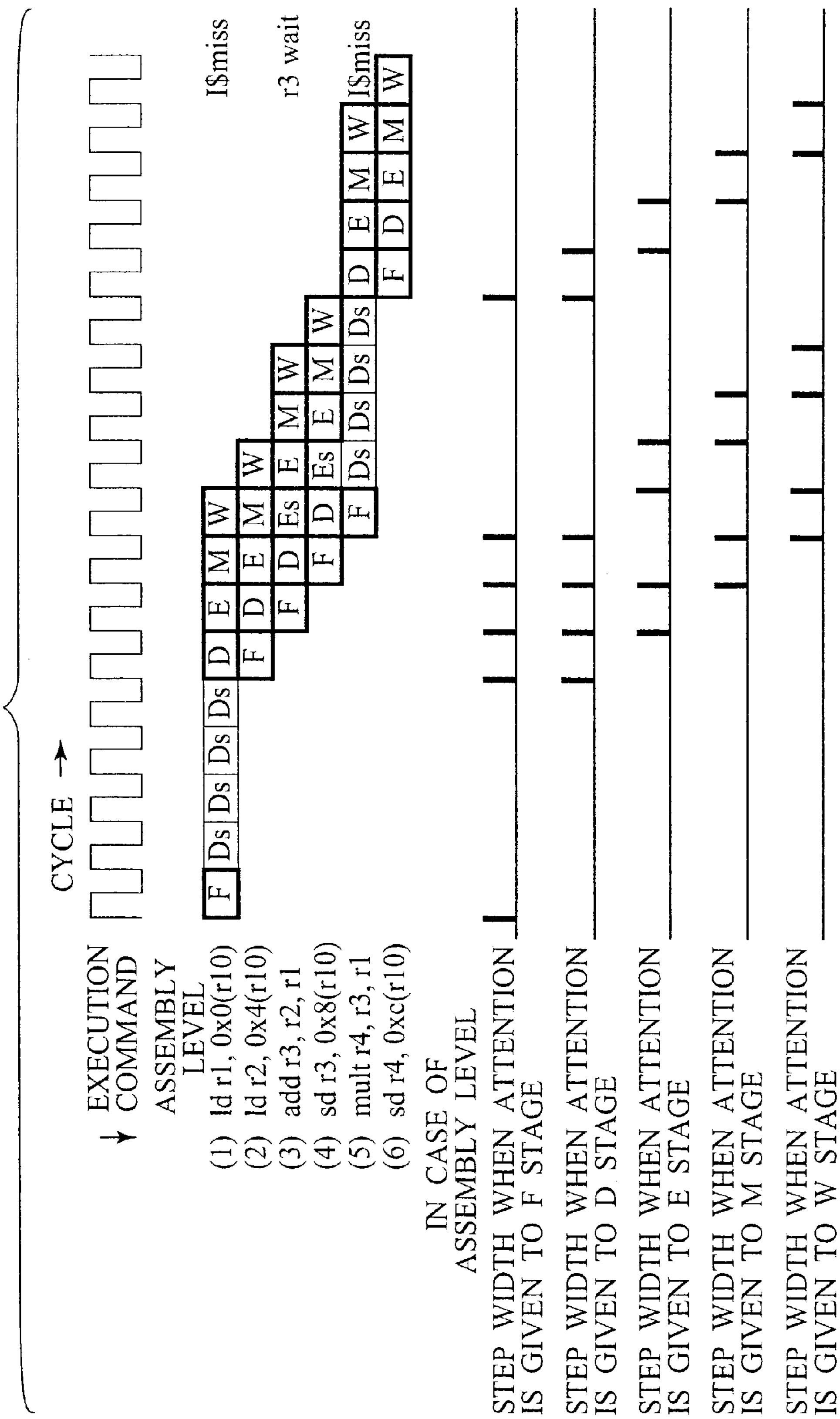
FIG. 12 is a view showing a step width when the display of FIG. 9 is applied at assembly level in the debugging method of the first embodiment of the present invention.
Figure 13:
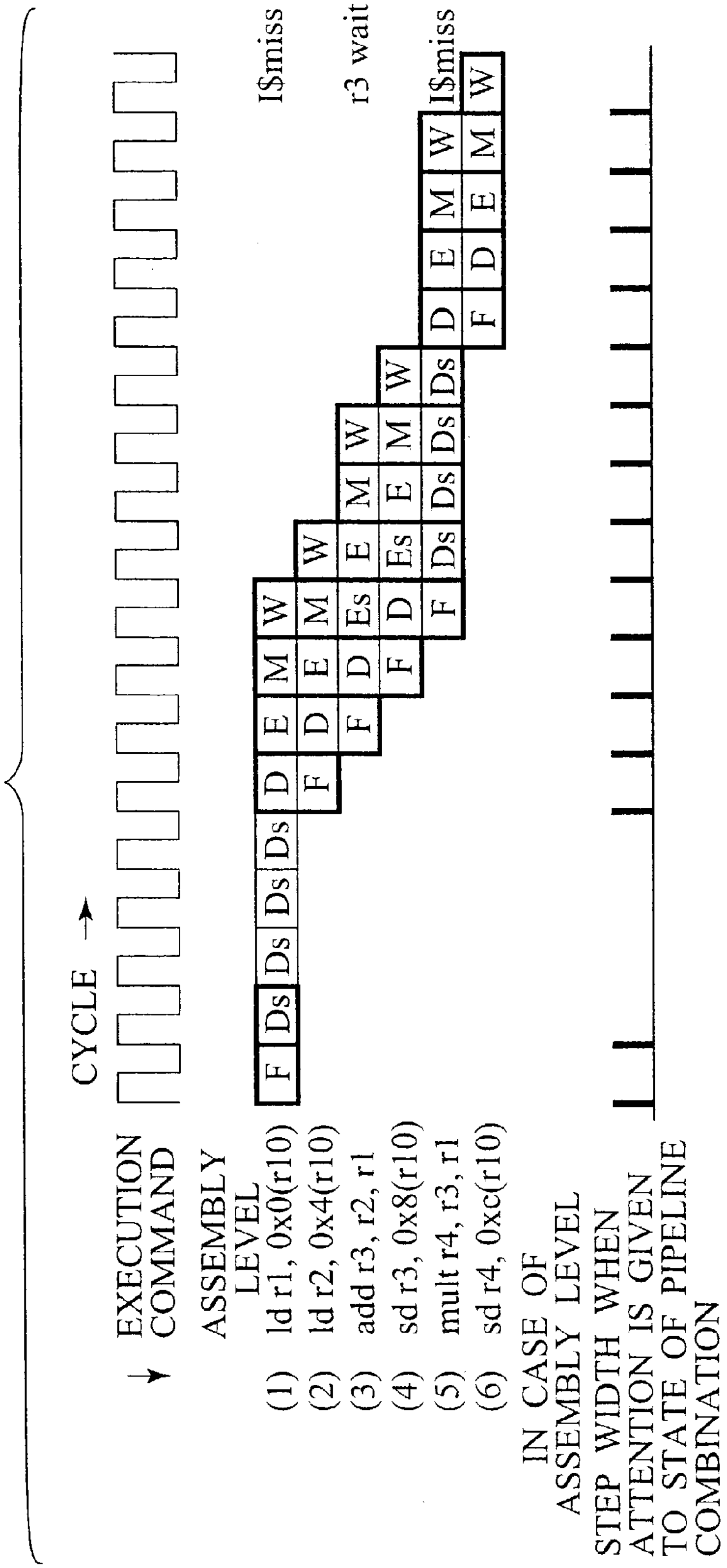
FIG. 13 is a view showing a step width when the display of FIG. 10 is applied at assembly level in the debugging method of the first embodiment of the present invention.

FIGS. 11 to 13 show step widths set when execution commands of the C language level shown in FIGS. 8 to 10 are respectively applied as execution commands at the assembly level. From FIG. 11, it can be understood that step widths are set for each changes in the execution commands at assembly level. From FIG. 12, it can be understood that when attention is given to the "F" stage, step widths are set for each changes in execution commands at assembly level, i.e., a first execution command ld r1,0x0(r10), a second execution command ld r2,0x4(r10), a third execution command add r3,r2,r1, a fourth execution command sd r3,0x8 (r10), a fifth execution command mult r4,r3,r1, and a 6th execution command sd r4,0xc(r10). It can also be understood that when attention is given to the "D", "E", "M" and "W" stages, similarly, step widths are set for each change in execution commands at assembly level. Further, from FIG. 13, it can be understood that step widths are set for each change in stage processing of execution commands at the assembly level.

According to the debugging method of the fourth specific example of the first embodiment, it is possible to carry out more detailed debugging by setting step widths at a time of command change at assembly level.

In the following second to fifth embodiments of the present invention, as command levels for debugging, high-level language and assembly levels are conceivable. However, description will be made only for the case of an assembly level.

SECOND EMBODIMENT

A software debugger 1 of a second embodiment of the present invention sets a step width for each change in an execution state for each cycle by acquiring an execution state of division (div) for each cycle from a hardware simulator 4 of FIG. 2.

In the second embodiment of the present invention, an execution command of division (div) is defined in addition to the execution commands (loading (ld), storing (sd), adding (add) and multiplying (mult)) executed on the CPU 3 of the target system 100 of FIG. 2 to be debugged in the first embodiment. Execution of this command of division (div) by using a hardware system dedicated for division execution requires thirty six cycles. Here, it is assumed that only one cycle is executed at a pipeline Execute stage, causing no pipeline stalling. In reality, however, since an operation of the hardware system dedicated for division execution is started simultaneously with execution at the Execute stage, a result of division is calculated after thirty six cycles. Accordingly, it is assumed that stalling occurs if subsequent commands are dependent on the division command.

Figure 15:
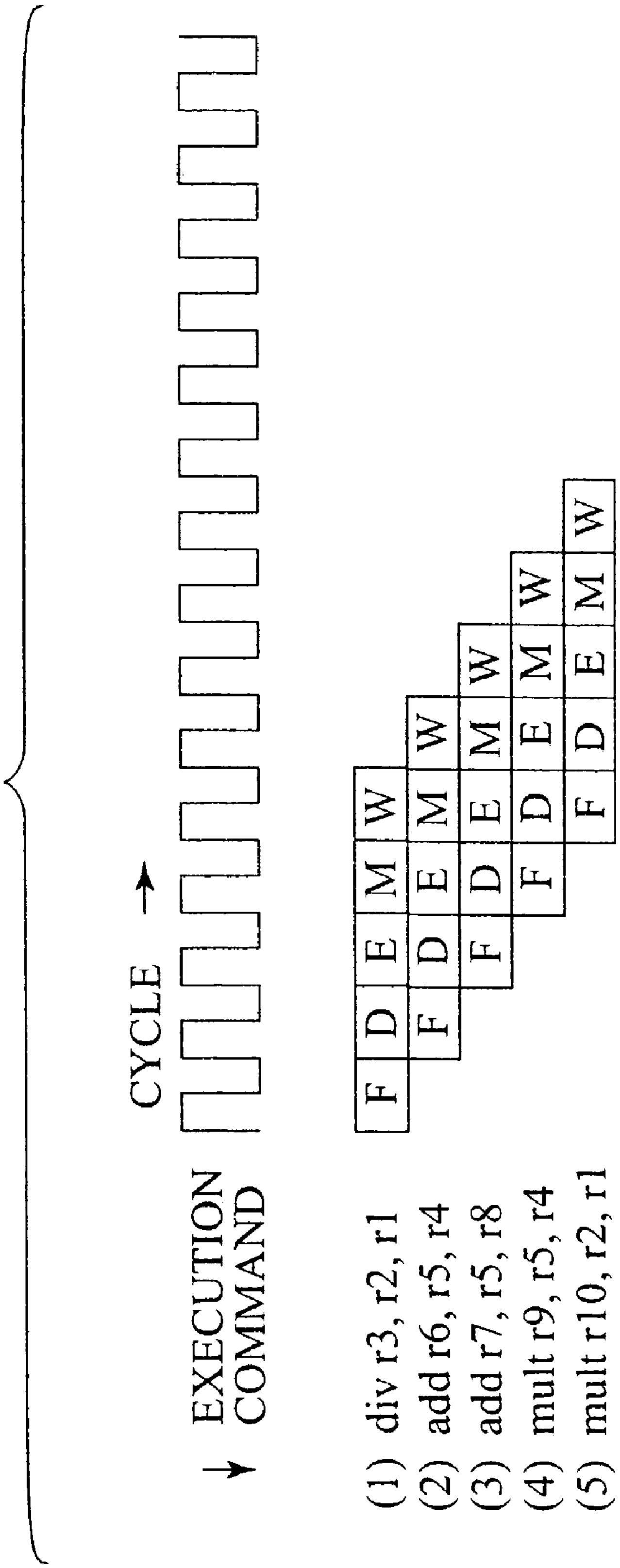
FIG. 15 is a view showing a result of a pipeline stage in a CPU at the time of execution of the program used by the software debugger of the second embodiment of the present invention.

FIG. 14 shows an example of a program executed on the software debugger 1 of the second embodiment of the present invention. As shown in FIG. 14, the program is written at assembly level. When the program of FIG. 14 is executed by the software debugger 1 of the first embodiment of the present invention, assuming that all the commands have been loaded on the instruction cache, an operation similar to that shown in FIG. 15 is carried out at the pipeline stage of the CPU 3. However, because of the use of the hardware system dedicated for division execution, an execution state of division as an execution command cannot be known in FIG. 15.

Thus, the software debugger 1 of the second embodiment of the present invention is designed to enable a step width to be set for each change in execution state for each cycle by acquiring the execution state of division (div) for each cycle from the hardware simulator 4.

Figure 16:
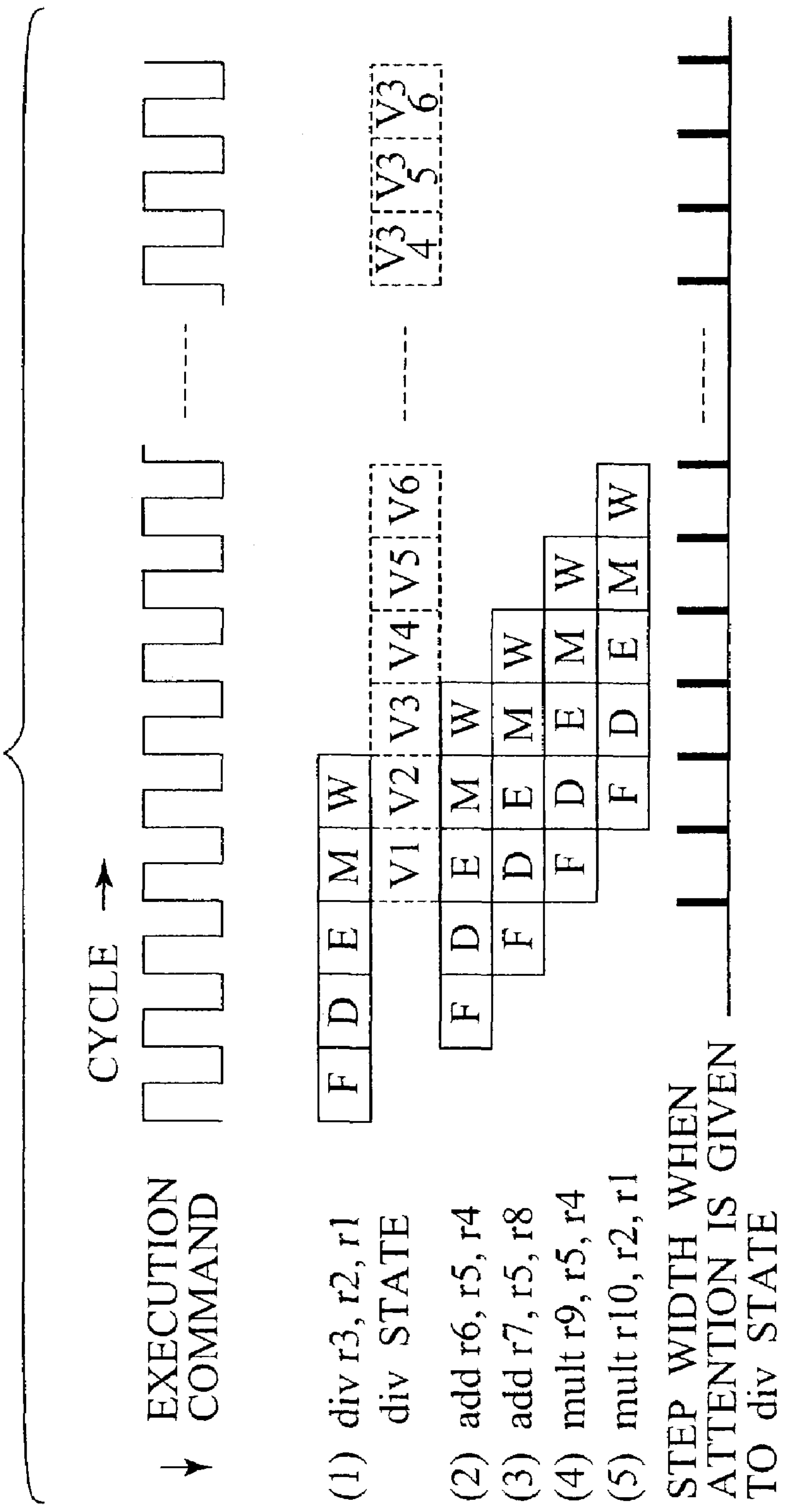
FIG. 16 is a view showing a result of a div state at the time of execution of the program used by the software debugger of the present invention.

It can be understood that in the case of executing the program of FIG. 14 by the software debugger 1 of the second embodiment of the present invention, a stage in the hardware system dedicated for division execution is changed as shown in FIG. 16 by acquiring information from the hardware simulator 4.

As described above, according to the software debugger 1 of the second embodiment of the present invention, it is possible to facilitate debugging carried out by considering external effects during the execution of the division command by matching a step width with a state change of the hardware system exclusively used for division execution.

THIRD EMBODIMENT

A software debugger 1 of a third embodiment of the present invention enables handling of a dual CPU to be dealt with.

Figure 17:
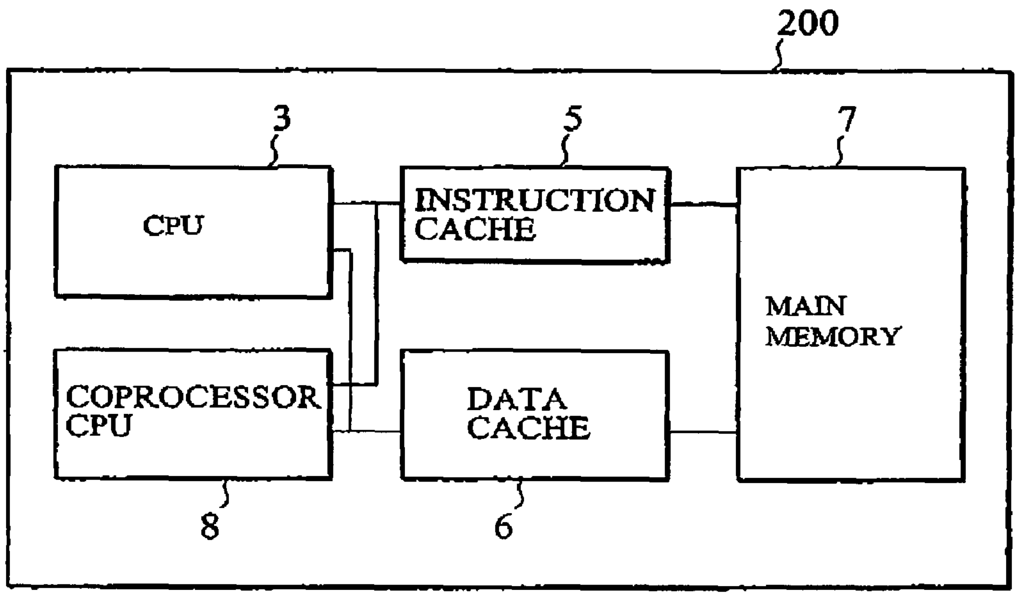
FIG. 17 is a configuration view of a target system to be debugged according to a third embodiment of the present invention.

FIG. 17 is a configuration view of a target system 200 to be debugged according to the third embodiment of the present invention. As shown in FIG. 17, the target system 200 of the third embodiment includes a CPU 3 executing programs to be debugged, a coprocessor CPU 8 connected to the CPU 3, an instruction cache 5 capable of loading (load)/storing (store) within one cycle, a data cache 6, and a main memory 7 requiring five cycles for loading/storing. Compared with the target system 100 to be debugged according to the first embodiment shown in FIG. 3, the target system 200 is different in that the coprocessor CPU 8 is provided in addition to the CPU 3. As in the case of the CPU 3 of the software debugger 1 of the first embodiment, the coprocessor CPU 8 has pipelines of five stages, and the CPU 3 is similar in operation and function to that described in the first embodiment. In the target system 200 to be debugged according to the third embodiment, execution commands executed on the coprocessor CPU 8 are loading (ld), storing (sd1), and multiplying (mult1).

FIG. 18 shows an example of a program executed on the software debugger 1 of the third embodiment of the present invention. As shown in FIG. 18, the program is described at assembly level, and composed of execution commands of loading (ld), storing (sd1) and multiplying (mult1).

METHOD EXAMPLE 3-1

The software debugger 1 of the third embodiment of the present invention sets a step width for each change in an internal state of the coprocessor CPU 8 by acquiring the internal state from the hardware simulator 4 of FIG. 2.

In the foregoing target system 200 to be debugged, not only the execution commands executed on the CPU 3 but also execution commands executed on a coprocessor CPU 8 belonging to the CPU 3 is present. Consequently, debugging cannot be carried out unless consideration is given to not only hardware state information of the CPU 3 but also to hardware state information of the coprocessor CPU 8. Thus, a debugging method of the third embodiment is designed to enable step widths to be set for each cycle, each change in a program counter at each pipeline stage, and each change in a combination of pipeline stages by acquiring an internal state of the coprocessor CPU 8 from the hardware simulator 4 of FIG. 2. The internal state of the coprocessor 8 includes the state described above with reference to the debugging method of the first embodiment of the present invention.

Figure 19:
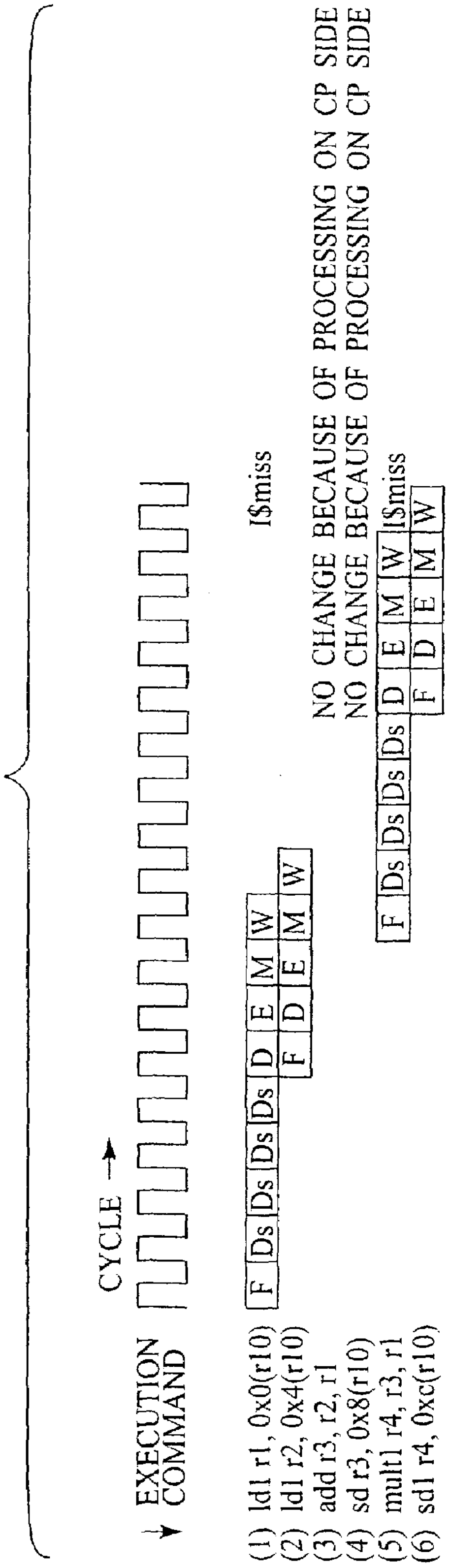
FIG. 19 is a view showing a result of a pipeline stage in a CPU at the time of execution of the program used by the software debugger of the third embodiment of the present invention.
Figure 20:
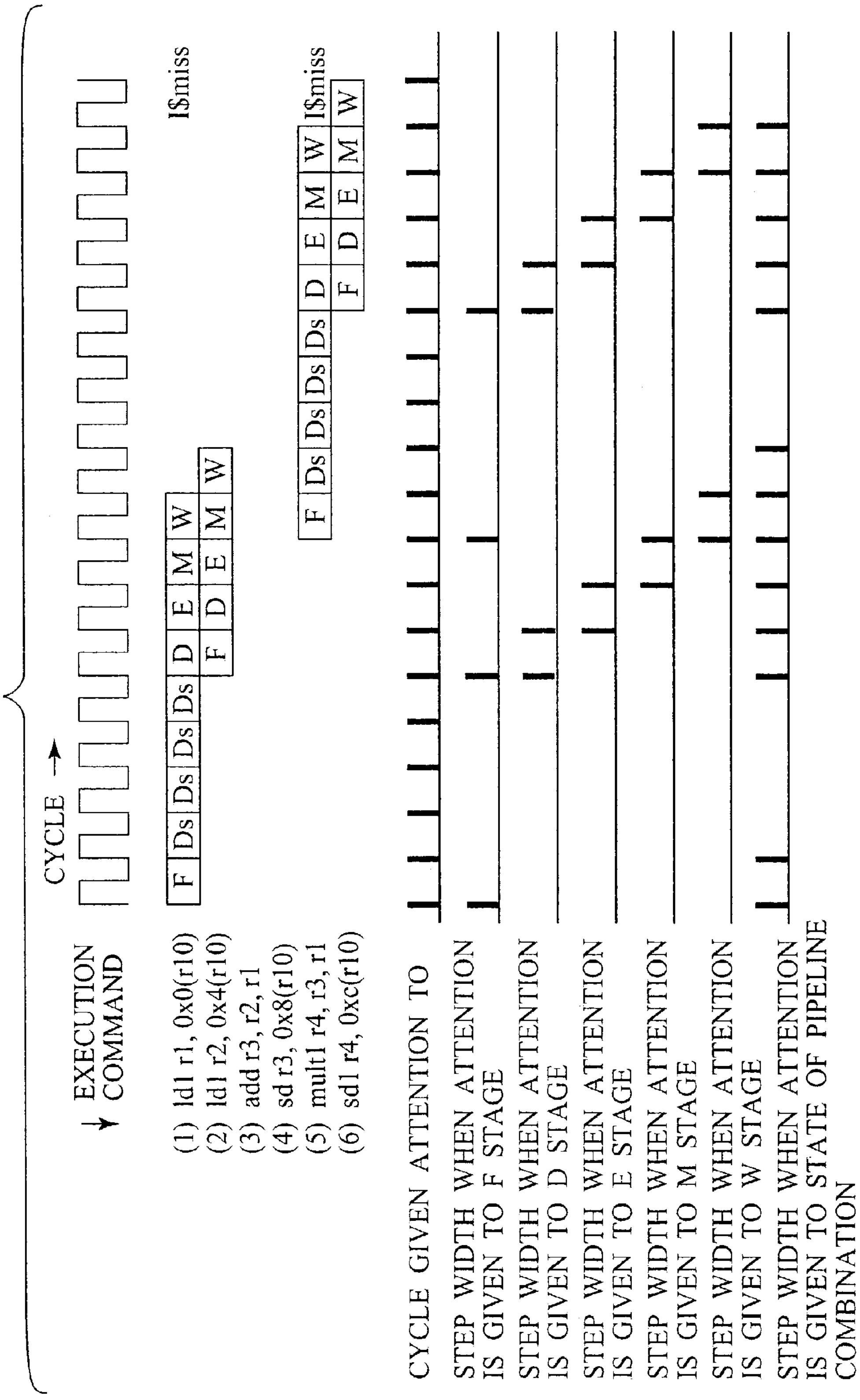
FIG. 20 is a view showing a step width when a debugging method of the third embodiment of the present invention is applied.

In the software debugger 1 of the third embodiment of the present invention, when a program shown in FIG. 18 is executed, a pipeline state in the coprocessor CPU 8 becomes a state similar to that shown in FIG. 19 by acquiring simulation information from the hardware simulator 4 of FIG. 2. FIG. 20 shows step widths set for each cycle, each change in a program counter at each pipeline stage, and each change in a combination of pipeline stages in synchronization with the state change by the debugging method of the third embodiment of the present invention.

According to the software debugging method of the first specific example of the third embodiment, it is possible to set step widths for each cycle, each change in a program counter at each pipeline stage, and each change in a combination of pipeline stages.

METHOD EXAMPLE 3-2

The software debugger 1 of the third embodiment of the present invention sets a step width for each accessing of the coprocessor CPU 8 of FIG. 17 from the outside.

Figure 21:
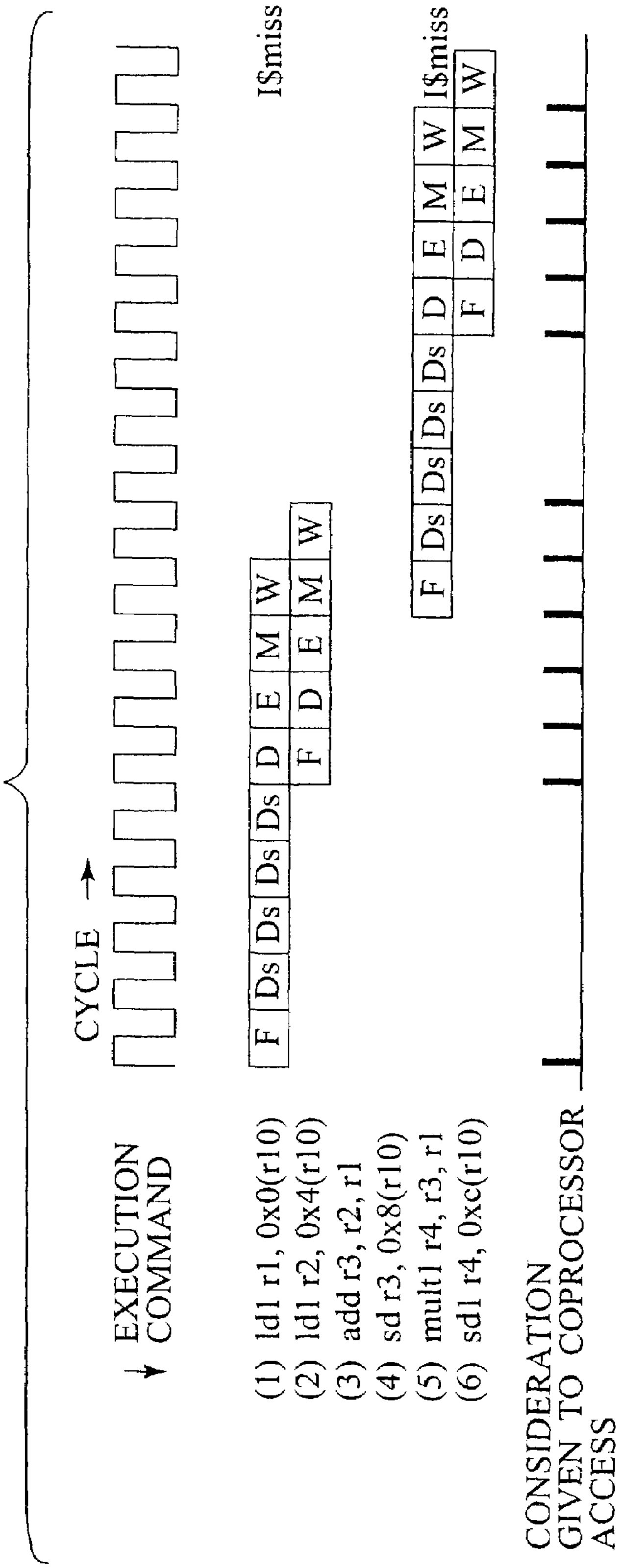
FIG. 21 is another view showing the step width when the debugging method of the third embodiment of the present invention is applied.

FIG. 21 shows a step width set for each accessing of the coprocessor CPU 8 from the outside when the program of FIG. 18 is executed on the CPU 3 and the coprocessor CPU 8 of FIG. 17.

A debugging method of a second specific example of the third embodiment is effective for debugging carried out with attention paid to an I/O interface of the coprocessor CPU 8 of FIG. 17. Moreover, since the CPU 3 and the coprocessor CPU 8 of FIG. 17 are operated in parallel, it is possible to easily debug when a program is operated with an unexpected combination of commands or the like.

FOURTH EMBODIMENT

In a software debugger 1 of a fourth embodiment of the present invention, it is assumed that two types of exceptions, i.e., “exception of external interruption” and “exception of address error”, occur in the CPU 3 of the target system 100 of FIG. 2 to be debugged according to the first embodiment. The “exception of external interruption” occurs by a given timing, and it is detected during the execution of the Execute stage on the CPU side. On the other hand, the “exception of address error” occurs during the execution of the Decode stage and, as in the case of the “exception of external interruption”, it is detected during the execution of the Execute stage. However, the “exception of address error” is higher in priority than the “exception of external interruption” and, when the “exception of external interruption” and the “exception of address error” are simultaneously detected, the “exception of address error” is detected in preference. If an exception is detected, the subsequent command is interrupted at the point in time at which the exception is detected, and a command for exception handling is newly executed. The CPU 3 of FIG. 2 incorporates a Cause register (hereinafter referred to as Cause Reg) as a coprocessor register, and a function thereof is defined as follows.

Cause Reg bit [1:0]: Saving of exception information. A default is set to 00, a bit 0 to 1 (01) after occurrence of “exception of external interruption”, and a bit 1 to 1 (10) after occurrence of “exception of address error”, and to 0 after resetting or execution of exception processing.

bit [2]: Detection of exception. Set to 0 at default, to 1 at time of detection, and to 0 after exception processing.

Hereinafter, explanation is made with reference to a case where an exception occurs during the execution of the program of FIG. 4 on the CPU 3 of the software debugger 1 of the fourth embodiment. As shown in FIG. 22, this is specifically a case where an “exception of external interruption” occurs during Decode stage execution stalling of the ld command of (1) (Cause Reg [1:0]=01), and an “exception of address error” occurs during Decode stage execution of (1) (Cause Reg [1:0]=11).

The CPU 3 recognizes the occurrence of both an “exception of external interruption” and an “exception of address error” based on Cause Reg [1:0]=11 during the Execute stage execution of (1). However, the “exception of address error” is detected due to priority, execution of all execution commands including execution commands exception-detected and executed at its cycle are stopped, and a command placed in the exception handler is executed by exception processing.

FIG. 22 shows a pipeline stage state of the CPU 3 in the middle of executing the foregoing series of processing operations, and change information for the Cause Reg defined above with information acquired from the hardware simulator 4 of FIG. 2.

METHOD EXAMPLE 4-1

The software debugger 1 of the fourth embodiment of the present invention can designate exception states as conditions by acquiring exception information from the hardware simulator 4 of FIG. 2 to set a break point for interrupting software simulation execution in an optional state.

In the software debugger 12 of FIG. 1, because of no consideration being given to the occurrence of exceptions, it was impossible to debug for processing when an exception occurred.

Figure 23:
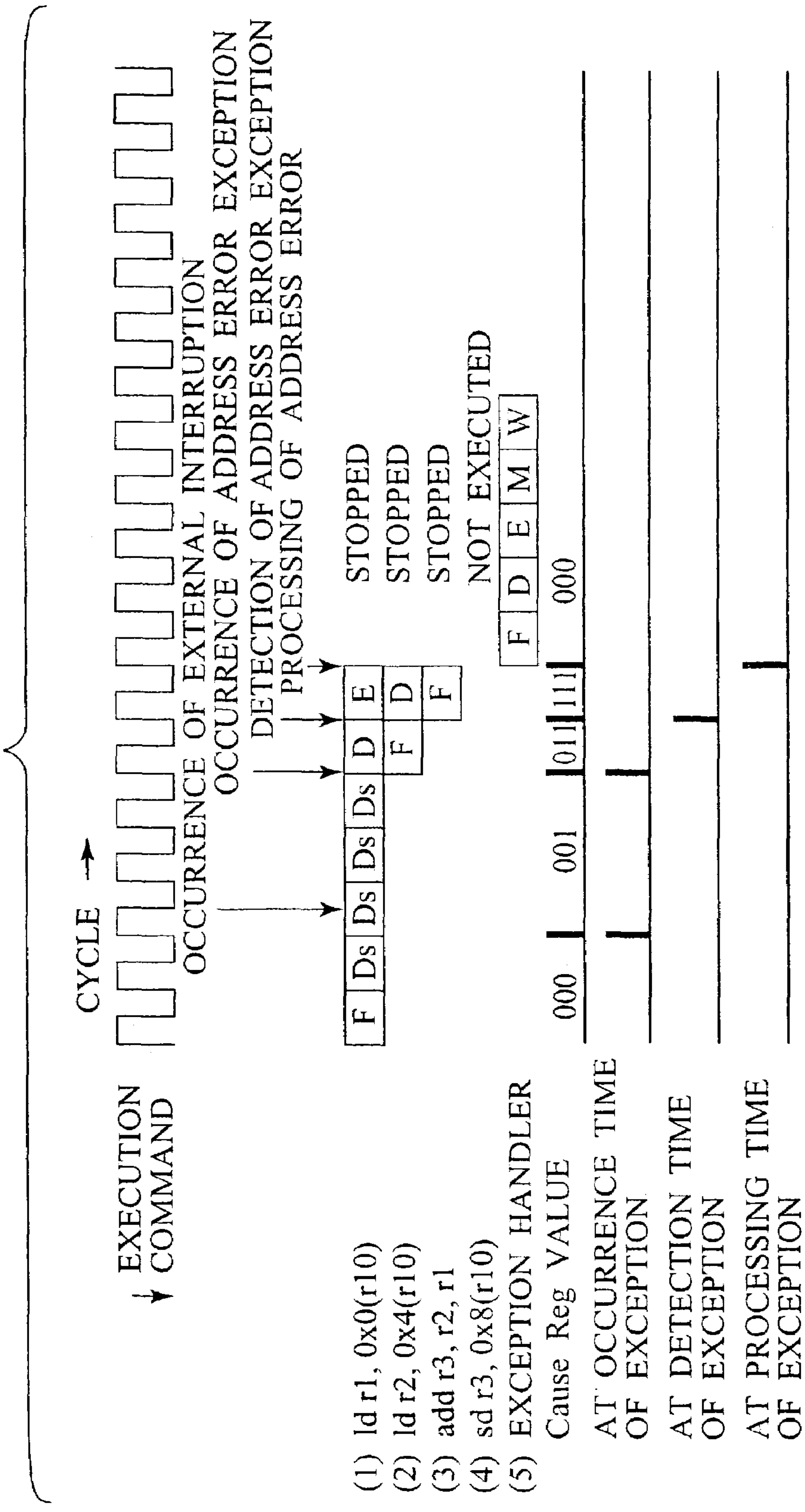
FIG. 23 is a view showing break places at the time of designation of break points by a debugging method of the fourth embodiment of the present invention.

Thus, a debugging method of a first specific example of the fourth embodiment is designed to enable a) an “occurrence time of exception”, b) an “detection time of exception” and c) an “processing time of exception” to be selected respectively as conditions of exceptions by acquiring exception information from the hardware simulator 4 of FIG. 2, and being enable quick checking to be made as to whether each is being processed or not according to an expected timing (a cycle, or execution program counter). Accordingly, the process can proceed to the timing at a jump. For example, by setting the values of a), b) and c) as break points for the foregoing exception processing, thereby designating points shown in FIG. 23 as break points, the process can proceed to each timing at a jump.

METHOD EXAMPLE 4-2

A software debugging method of a second specific example of the fourth embodiment can designate the times of changes for all program counter registers or fields of the CPU 3 of FIG. 2 with respect to setting of break points for interrupting program execution.

Figure 24:
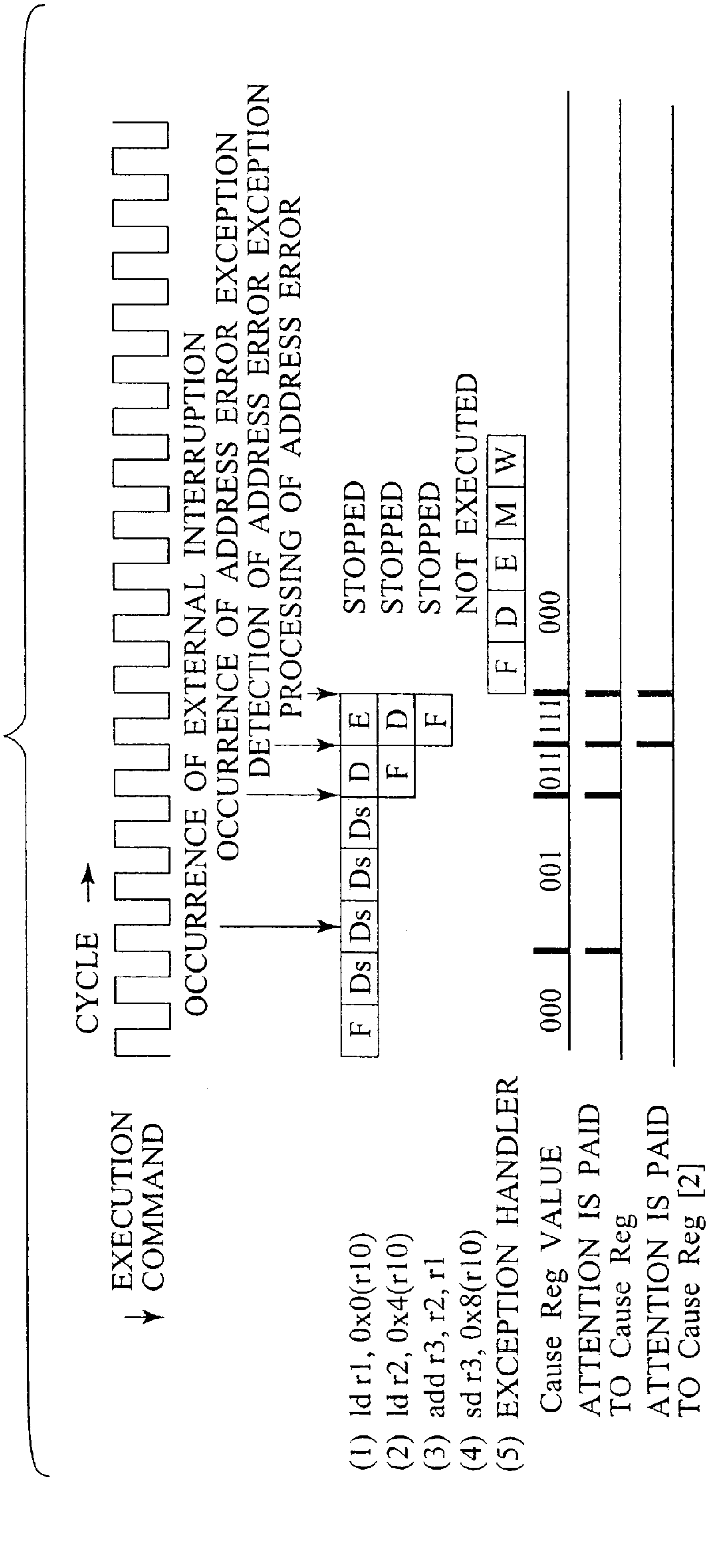
FIG. 24 is another view showing the break places at the time of designation of break points by the debugging method of the fourth embodiment of the present invention.

For example, for the CPU 3 of FIG. 2 operated as shown in FIG. 22, by designating changes throughout of the entire Cause Reg as break points, it is possible to facilitate debugging carried out during command executed concerning the Cause Reg. Further, when debugging is carried out by narrowing down points for the register, it is possible to easily debug by designating field changes as break points as in the case of bit [2] of the Cause Reg. Break timings when these break points are designated become similar to those shown in FIG. 24.

According to the debugging method of the second specific example of the fourth embodiment, it is possible to facilitate the debugging being carried out by including the coprocessor register, which was not targeted in the conventional debugging.

FIFTH EMBODIMENT

A software debugger 1 of a fifth embodiment of the present invention enables program counters being executed at optional pipeline stages of a targeted CPU 3 to be selected from the program counters displayed by the software debuggers 1 of the first to fourth embodiments of the present invention.

Processing being carried out in the CPU 3 has a close relationship to each pipeline stage. Accordingly, programs expected by a user are different depending on the contents of software and the step conditions of software to be debugged.

Figure 25:
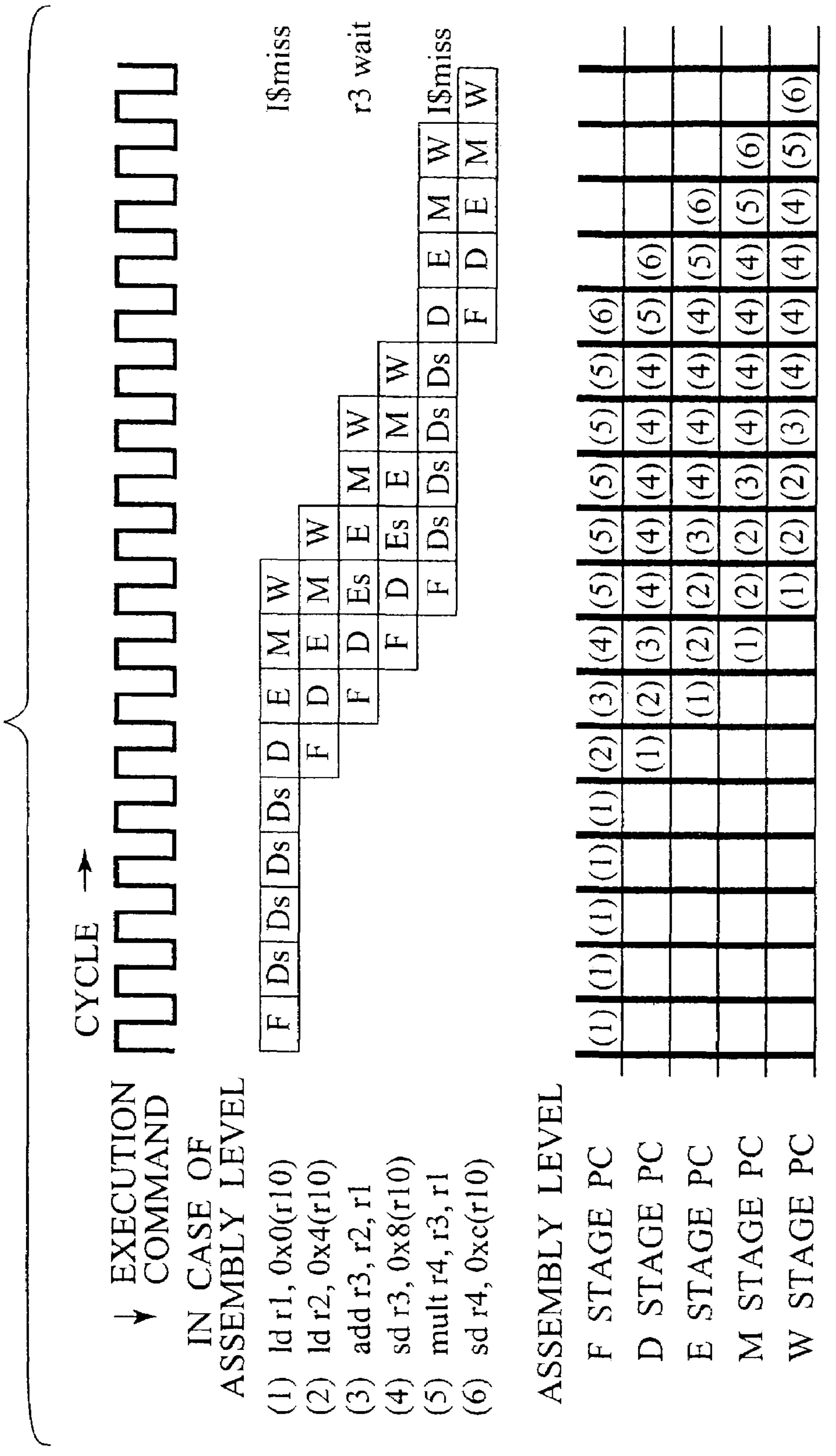
FIG. 25 is a view showing an example when a display program counter of a software debugger of a fifth embodiment of the present invention is changed.

FIG. 25 is a view when a program counter is changed by the software debugger 1 of the fifth embodiment of the present invention.

According to the software debugger 1 of the fifth embodiment of the present invention, since a program counter to be displayed can be optionally selected from the program counters executed at the respective pipeline stages of the targeted CPU, it is possible to increase debugging efficiency.

As described above, according to the software debugger, the system-level debugger, the debugging method and the debugging program of the present invention, debugging including a concept of time can be carried out when the software executed on the system incorporating the CPU is debugged. With respect to the step range of the program counter, conventionally it was only available in command units. However, it becomes possible to select various step ranges, and to debug more effectively according to user's purpose by selecting program counters with consideration given to the internal state (pipeline stage or the like) of the CPU. Furthermore, by adding interruptions to the break point conditions for temporarily stopping debugging, it is possible to debug during interruption processing, which was not dealt with by the conventional software debugger.

The apparatus of the present invention may be implemented with various corrections and modifications without falling outside of the spirit and scope of the present invention as laid out by the patent claims. Accordingly, the description included in this application is intended to be an exemplary description, and is not meant to be construed as limiting the present invention in any manner.

What is claimed is:

1. A debugging method, comprising:

acquiring cycle level execution information from a hardware simulator for simulating a hardware system to be debugged; and executing debugging by setting a processing width for time of one step execution instruction during debugging of a program executed on the hardware system based on the cycle level execution information, wherein the executing debugging includes setting the processing width for the time of one step execution instruction for each change in an execution state for each cycle of a division command.

2. A debugging method, comprising:

acquiring cycle level execution information of a program from a hardware simulator that simulates an execution of the program by a hardware system at a cycle level; and debugging the program with a software debugger by setting a step width for debugging the program at the cycle level based on the cycle level execution information, wherein the step width is set for each change in an execution state for each cycle of a division command.

* * * * *